Oct. 3, 1967 R. M. DAVIS 3,344,536
TEACHING APPARATUS
Original Filed Dec. 16, 1963 2 Sheets-Sheet 1
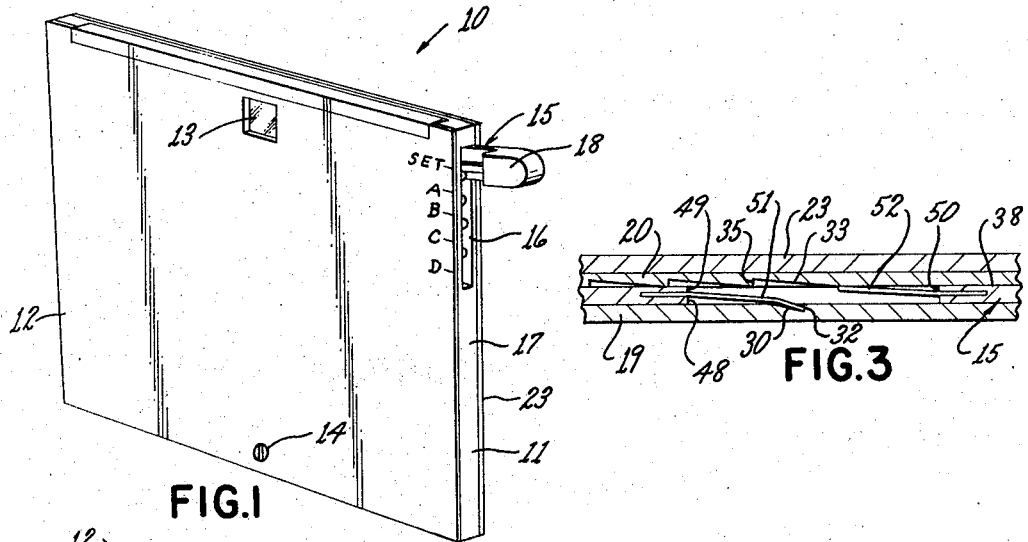
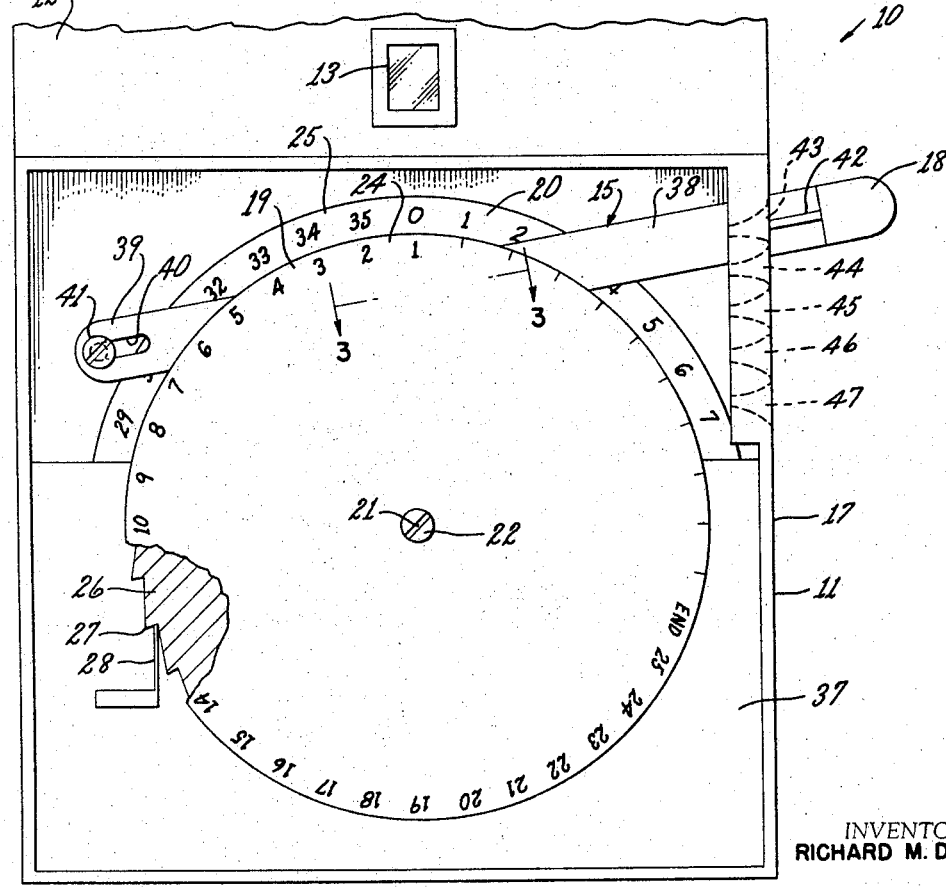
INVENTOR.
RICHARD M. DAVIS
BY
Caudn & Caudn
HIS ATTORNEYS Oct. 3, 1967    R. M. DAVIS    3,344,536
TEACHING APPARATUS
Original Filed Dec. 16, 1963    2 Sheets-Sheet 2

INVENTOR.
RICHARD M. DAVIS
BY
Caudin & Caudin
HIS ATTORNEYS

United States Patent Office 3,344,536
Patented Oct. 3, 1967

3,344,536
TEACHING APPARATUS
Richard M. Davis, 4417 Glenheath Drive,
Kettering, Ohio 45440
Continuation of application Ser. No. 330,707, Dec. 16, 1963. This application June 3, 1966, Ser. No. 562,413
10 Claims. (Cl. 35—48)

ABSTRACT OF THE DISCLOSURE

This disclosure relates to a teaching apparatus wherein a first wheel is rotatably mounted to a frame means and a second wheel is rotatably mounted to the frame means, a student operated lever means or the like is disposed between the wheels and is movable between a selected answering position thereof and an actuating position thereof whereby a first means on the lever will advance the first wheel one increment in a particular direction each time a correct answer is selected by the operator moving the lever between a selected answering position thereof and its actuating position thereof while second means on the lever will always advance the second wheel one increment in a particular direction thereof each time an answer is selected by the operator so that the first wheel cannot be reset back to its starting position by the lever until after all of the questions have been answered correctly as indicated by the first wheel with the second wheel indicating the number of times answers have been selected, either correctly or incorrectly, to cause the first wheel to move to its end of cycle position.

---

This application is a continuation of its copending parent patent application, Ser. No. 330,707, filed Dec. 16, 1963, now abandoned.

This invention relates to an improved teaching apparatus or the like.

One feature of this invention is to provide a teaching apparatus which will record the total number of answers made to a set of multiple choice questions by a student who must eventually select the correct answer for each question before the student can complete the set of questions.

In particular, this invention provides a teaching apparatus that includes a substantially rectangular container having an actuating lever for selecting one of a multiple choice of answers for a particular set of questions given to the student and keyed to the particular operating mechanism in the container, the container automatically recording the total number of answers to the particular set of multiple choice questions regardless of the number of incorrect answers the student makes for each question.

Accordingly, it is an object of this invention to provide an improved teaching apparatus having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a perspective view of the improved teaching apparatus of this invention.

FIGURE 2 is an enlarged front view of the teaching apparatus illustrated in FIGURE 1 with the cover member moved to its opened position.

FIGURE 3 is an enlarged, fragmetary, cross-sectional view taken on line 3—3 of FIGURE 2.

Figure 4:
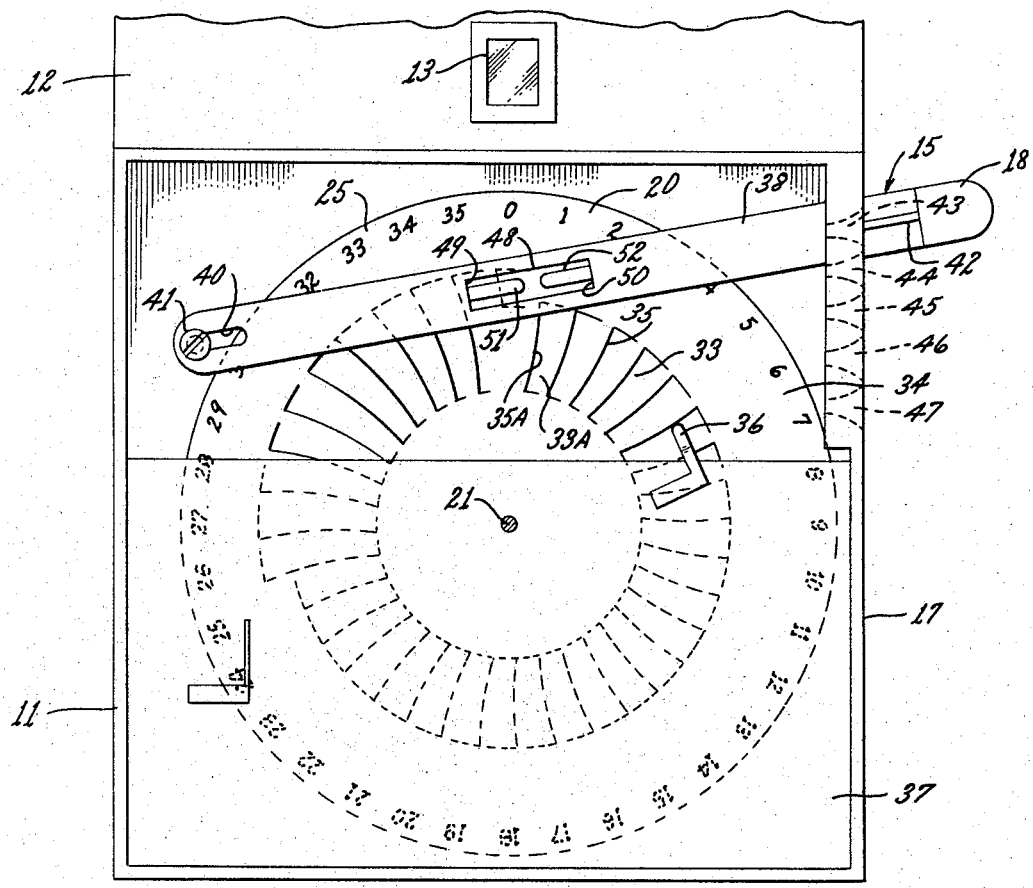
FIGURE 4 is a view similar to FIGURE 2 with the question wheel thereof removed.

While the various features of this invention are hereinafter described and illustrated as being particularly adaptable for providing a teaching apparatus, it is to be understood that the various features of this invention can be utilized singly or in any combination thereof to provide other devices as desired.

Therefore, this invention is not to be limited to only the embodiment illustrated in the drawings, because the drawings are merely utilized to illustrate one of the wide variety of uses of this invention.

Referring now to FIGURE 1, the improved teaching apparatus of this invention is generally indicated by the reference numeral 10 and comprises a substantially rectangular container construction 11 having an openable cover member 12 provided with a glass closed opening 13 for a purpose hereinafter described, the cover member 12 being adapted to be locked in its closed position by a suitable key-operated lock means 14 in a manner conventional in the art.

A lever member 15 of the apparatus 10 projects outwardly through a slot means 16 in the side 17 of the container 11 and has a handle portion 18 for permitting the student to select one of a multiple choice of answers as indicated by the reference letters "A–D" or any desired number of multiple choice answers as will be apparent hereinafter.

Also, the lever 15 is adapted to be disposed in the position illustrated in FIGURE 1 to reset the apparatus 10 to its starting position as will be apparent hereinafter.

As illustrated in FIGURE 2, two wheel-like members 19 and 20 are respectively rotatably mounted in the container 11. In particular, the wheels 19 and 20 are adapted to rotate about a common axis 21 defined by a fastening member 22 passing through the wheels 19 and 20 and being detachably secured to the rear wall 23 of the container 11 whereby the wheel 19 can be changed as desired for a different set of questions for the teaching apparatus 10 as will be apparent hereinafter.

The wheel 19 will be hereinafter referred to as a question wheel 19 and the wheel 20 will be hereinafter referred to as an answer wheel 20 which will be apparent hereinafter.

The question wheel 19 has an outer peripheral portion 24 provided with a plurality of sequenced numbers starting with "1" and progressing upwardly in a counterclockwise relationship about the outer peripheral portion 24 of the question wheel 19, the numbers terminating with the term "end" whereby each number on the question wheel 19 can be serially viewed through the windowed opening 13 in the cover member 12 for a purpose hereinafter described.

Similarly, the answer wheel 20 has an outer peripheral portion 25 extending beyond the peripheral portion 24 of the question wheel 19 and is provided with a sequence of numbers thereon beginning with "0" and progressing upwardly to any desired total number in a clockwise fashion about the peripheral portion 25 of the answer wheel 20. In this manner, the particular numbers on the answer wheel 20 can be serially viewed through the windowed opening 13 in the cover member 12 above a particular question number on the question wheel 19 as will be apparent hereinafter.

The question wheel 19 is provided with a rear portion 26 having a plurality of ratchet-like teeth 27 disposed about the outer periphery thereof whereby a leaf spring 28 carried by the container 11 functions to prevent counterclockwise rotation of the question wheel 19 while permitting clockwise rotation thereof for a purpose hereinafter described.

Figure 5:
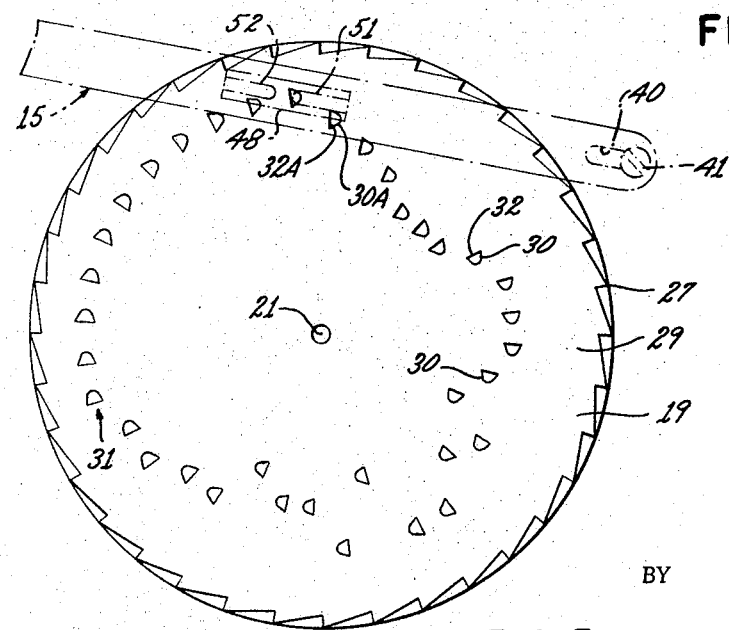
FIGURE 5 is a rear view of the actuating lever and question wheel of the apparatus illustrated in FIGURE 2.

As illustrated in FIGURES 3 and 5, the rear surface 29 of the question wheel 19 is interrupted by a plurality of recesses 30 arranged circumferentially around the rear surface 29 of the question wheel 19 in a predetermined pattern to correspond to the answers to a particular set of multiple choice questions in a manner hereinafter described, the row 31 of recesses 30 illustrated in FIGURE 5 being utilized for resetting purposes in a manner hereinafter described.

Each recess 30 in the rear surface 29 of the question wheel 19 feathers downwardly to terminate at a substantially straight shoulder or edge means 32 for a purpose hereinafter described.

The answer wheel 20 also has a plurality of recesses 33 formed in the front surface 34 thereof in the manner illustrated in FIGURES 3 and 4, each recess 33 terminating in an arcuately disposed edge means or shoulder means 35 for a purpose hereinafter described, the shoulder means 35 and recesses 33 being longer in relation to the numbers thereon exceeding the number of questions on the question wheel 19 and terminating at the "0" position thereof for a purpose hereinafter described.

A leaf type spring 36 is carried by the container 11 and projects inwardly into the recesses 33 in the surface 34 of the answer wheel 20 to prevent clockwise rotation thereof but permitting counterclockwise rotation of the answer wheel 20 for a purpose hereinafter described.

A partial separator sheet 37 is disposed in the container 11 and separates the question wheel 19 from the answer wheel 20 thereof, the separator sheet 37 effectively carrying the leaf spring means 28 and 36 previously described.

The lever 15 has a substantially flat medial portion 38 thereof projecting into the container 11 and being received between the question wheel 19 and the answer wheel 20 for a purposee hereinafter described, the lever 15 having a left end 39 provided with an elongated slot 40 receiving a pivot pin 41 secured to the container 11 in any suitable manner.

Thus, it can be seen that the pivot pin 41 secures the lever 15 to the container 11 while permitting the same to pivot about the pivot pin 41 within the limits of the slot 16 of the container 11 and permitting the same to move rightwardly and leftwardly relative to the container 11 in any of its pivoted positions within the limits of the slot 40 in the lever 15.

The lever 15 has a ridge means 42 extending inwardly from the handle portion 18 thereof and being adapted to be respectively received in slot means 43, 44, 45, 46 and 47 formed in the side 17 of the container 11 and joined with the slot 16 thereof, the slot 33 corresponding to the resetting position of the lever 15, while the slots 43–47 correspond respectively to the selection of multiple choice answers "A" through "D."

The medial portion 38 of the lever 15 has an elongated slot 48 cut therein intermediate the question wheel 19 and answer wheel 20, the slot 48 defining a lefthand shoulder 49 and a righthand shoulder 50 for the lever 15.

A pair of spring fingers 51 and 52 are respectively carried by the lever 15 and project outwardly from the shoulders 49 and 50 of the lever 15, the finger 51 being spring biased toward the rear surface 29 of the question wheel 19 while the spring finger 52 is biased toward the front surface 34 of the answer wheel 20.

Therefore, it can be seen that the teaching apparatus 10 of this invention is formed from a relatively few parts which can be simply and economically manufactured, whereby the overall cost of the teaching apparatus 10 of this invention is relatively small.

The operation of the teaching apparatus 10 of this invention will now be described.

Assuming that the question wheel 19 is disposed in the position illustrated in FIGURE 2 and that the answer wheel 20 is also disposed in the position illustrated in FIGURE 2, whereby the student will view through the windowed opening 13 in the cover 12 of the container 11 that the apparatus 10 is set for him to answer the Question No. 1 and that no answers have been previously selected, the instructor gives the apparatus 10 to the student, together with a sheet containing a series of multiple choice questions and answers keyed to the particular question wheel 19 disposed in the container 11.

The student takes the sheet of questions and makes a determination of the proper answer choice for Question No. 1.

Let's assume that the student selects Answer "A" to Question No. 1 and that Answer "A" is the proper answer for Question No. 1.

The student then positions the lever 15 while in its outward position adjacent the slot 44 and pushes inwardly on the lever 15, whereby the ridge 42 of the lever 15 enters the slot 44 and the lever 15 is moved to the left from the position illustrated in FIGURE 2. As the lever 15 is moved to the left in the "A" answer position thereof, the spring finger 52 of the lever 15 engages the ridge means 35A of the recess 33A of the answer wheel 20 and advances the same one increment in a counterclockwise direction so that the numeral "1" thereof now appears at the windowed opening 13 of the cover member 12 to indicate that an answer selection has been made, whether right or wrong.

After the lever 15 has been pushed inwardly into the container 11, the leftward movement of the same is terminated by the pin 41 abutting the right end of the slot 40 thereof, whereby the student now pulls the lever 15 back outwardly to the position illustrated in FIGURE 2. Since the proper answer has been selected, it can be seen that the spring finger 51 of the level 15 enters the recess 30A in FIGURE 5 and bears against the edge means 32A thereof to advance the question wheel 19 one increment in a clockwise direction in FIGURE 2, so that the reference numeral "2" on the question wheel 19 will now be viewed through the windowed opening 13 in the cover member 12 of the container 11 to indicate to the student that he has answered Question No. 1 correctly and must now proceed to answer Question No. 2.

Alternately, let us assume that for Question No. 1 the student made a selection of Answer "D," which is an incorrect answer for Question No. 1.

The student thus positions the lever 15 adjacent the slot 37 in the end 17 of the container 11 and pushes inwardly on the same, whereby the finger 52 of the lever 15 advances the answer wheel 20 on increment in a counterclockwise direction, in the manner previously described.

However, when the student pulls outwardly on the lever in its "D" position, it can be seen that the finger 51 thereof does not engage the edge means 32A of the recess 30A in the question wheel 19, whereby the question wheel 19 remains in the position illustrated in FIGURE 2 and indicates to the student that an incorrect answer has been made and that the student must select another answer. When the student selects another answer to the Question No. 1 and if the same is incorrect, the answer wheel 20 will again be advanced and the question wheel 19 will remain stationary. Thus, it can be seen that the student must correctly answer Question No. 1 before the question wheel 19 will advance to Question No. 2 while the answer wheel 20 will record every time an answer has been selected by the student whether correctly or not.

Thus, the student continues to answer each question in sequence until all of the questions have been correctly answered and the term "End" on the question wheel 19 is disposed at the windowed opening 13 of the cover member 12 of the container 11. At this time, the total number of answers made for the particular set of questions for the apparatus 10 will be viewed on the outer periphery 25 of the answer wheel 20 of the windowed opening 13 in the cover member 12 of the container 11, whereby the score of the student can be recorded.

In order to reset the question wheel 19 and answer wheel 20 back into their original starting positions after a set of questions have been completely answered, the student or instructor will position the lever 15 at the "Set" position thereof, as illustrated in FIGURES 1 and 2, and sequentially work the lever 15 inwardly and outwardly to advance the wheels 19 and 20 back to the position illustrated in FIGURE 2, whereby further movement of the lever in the "Set" position thereof will not advance the wheels 19 and 20 beyond the position illustrated in FIGURE 2. Thus, it can be seen that resetting of the wheels 19 and 20 is substantially semi-automatic.

During the resetting of the wheels 19 and 20, it can be seen that each time the lever 15 is moved inwardly at its "Set" position thereof, the spring finger 52 thereof engages the edge means 35 of the longer recesses 33 of the answer wheel 20 to advance the wheel 20 one increment in a counterclockwise direction and it can be seen that every time the lever 15 is moved outwardly at its "Set" position, the finger 51 of the lever 15 engages against an edge means 32 of a recess 30 in the row 31 thereof to advance the question wheel 19 in a clockwise direction.

Because of the longer recesses 33 are so constructed and arranged in the answer wheel 20 and the row 31 of recesses 30 in the question wheel 19 are so constructed and arranged, it can be seen that once the wheels 19 and 20 have been advanced back to the starting position illustrated in FIGURE 2, further actuation of the lever 15 in its "Set" position will not cause further movement of the wheels 19 and 20.

Therefore, it can be seen that not only has there been provided an improved teaching apparatus which will record the total number of answers selected by a student for a particular set of questions, regardless of whether all the questions are answered correctly or incorrectly but also the teaching apparatus of this invention permits the same to be reset so that the student can again perform the teaching operation in the manner previously described.

Further, it can be seen that in order to prevent a student from learning the particular key pattern for a particular question wheel 19, the question wheel 19 can be readily removed from the container 11 by the instructor and can be replaced by another question wheel 19 having the recesses 30 thereof formed in a new pattern keyed to another set of questions.

Accordingly, it can be seen that this invention provides an improved teaching apparatus, having many novel features over prior known teaching apparatus.

While the form of the invention now preferred has been disclosed as required by the statutes, other forms may be used, all coming within the scope of the claims which follow.

What is claimed is:

1. A teaching apparatus comprising a frame means, a first member movably mounted to said frame means and having lever actuatable means arranged in two predetermined patterns, a second member movably mounted to said frame means and having lever actuatable means arranged in two predetermined patterns, and a lever movably mounted to said frame means, said lever being movable by the user to various answering positions thereof and being movable from a selected answering position thereof to an actuated position thereof, said answering position of said lever being related to one of said predetermined patterns of said lever actuatable means of each of said members, said lever also being movable to a resetting position thereof and being movable from said resetting position thereof to said actuating position thereof, said resetting position of said lever being related to the other of said predetermined patterns of said lever actuatable means of each of said members, said lever having a first means for only advancing said first member one increment in a particular direction for said first member by actuating said lever actuatable means of said one pattern of said first member each time a correct answer is selected by the operator moving said lever between a selected answering position thereof and said actuating position thereof, said first means also advancing said first member one increment in said particular direction for said first member back to its starting position by actuating said lever actuatable means of said other pattern of said first member when said lever is moved by the operator between said resetting position thereof and said actuating position thereof, said lever having a second means thereon for always advancing said second member one increment in a particular direction for said second member by actuating said lever actuatable means of said one pattern of said second member each time an answer is selected by the operator moving said lever between a selected answering position thereof and said actuating position thereof, said second means also advancing said second member one increment in said particular direction for said second member back to its starting position by actuating said lever actuatable means of said other pattern of said second member when said lever is moved by the operator between said resetting position thereof and said actuating position thereof.

2. A teaching apparatus as set forth in claim 1 wherein said lever actuatable means of said other pattern of said first member is so arranged relative to said one pattern of said first member that said first means of said lever cannot actuate said lever actuatable means of said other pattern of said first member to reset it back to its starting position until after all of the questions have been answered correctly to properly position said lever actuatable means of said other pattern of said first member relative to said first means of said lever for actuation thereby.

3. A teaching apparatus as set forth in claim 1 wherein said first member indicates the particular question to be answered and wherein said second member indicates the number of answers that the operator has selected whether the answers selected are correct or are wrong.

4. A teaching apparatus as set forth in claim 1 wherein said first means comprises a single finger carried by said lever.

5. A teaching apparatus as set forth in claim 1 wherein said second means comprises a single finger carried by said lever.

6. A teaching apparatus as set forth in claim 1 wherein said lever is disposed between said first and second members.

7. A teaching apparatus as set forth in claim 1 wherein said particular direction of movement for said first member is opposite to said particular direction of movement for said second member.

8. A teaching apparatus as set forth in claim 1 wherein said frame means comprises a container having said members and lever therein, said members being rotatably mounted inside said container.

9. A teaching apparatus as set forth in claim 8 wherein said container has an opening therein for viewing parts of said members.

10. A teaching apparatus as set forth in claim 1 wherein said second member has an edge portion extending beyond said first member.

References Cited

UNITED STATES PATENTS

| | | | |
|---|---|---|---|
| 2,311,055 | 2/1943 | Kopas | 35—48 |
| 2,871,577 | 2/1959 | Davis | 35—48 |

EUGENE R. CAPOZIO, *Primary Examiner.*

W. W. NIELSEN, *Assistant Examiner.*